E. SPAULDING.
Mortar-Mixers and Grinders.

No. 139,338.  Patented May 27, 1873.

Witnesses:

Inventor:
E. Spaulding
Per
Attorneys.

UNITED STATES PATENT OFFICE.

EDWARD SPAULDING, OF KEENE, NEW HAMPSHIRE.

IMPROVEMENT IN MORTAR MIXERS AND GRINDERS.

Specification forming part of Letters Patent No. 139,338, dated May 27, 1873; application filed April 12, 1873.

*To all whom it may concern:*

Be it known that I, EDWARD SPAULDING, of Keene, in the county of Cheshire and State of New Hampshire, have invented a new and Improved Machine for Mixing and Grinding Mortar, of which the following is a specification:

My invention consists of a series of rotary mixers suspended in a mixing-vat from a reciprocating carriage, on which they are moved forward and back across the vat, and, at the same time, revolved for mixing the lime and sand.

My invention also consists of another vat by the side of the mixing-vat, with a grinding mechanism at one end, into which the lime and sand, after being mixed, are discharged to be worked through the grinder, while another batch is being prepared in the mixer.

The machine is designed to be arranged on wheels, to be moved about the streets from place to place conveniently, and will be arranged for being worked by horse-power, or in any preferred way.

Figure 1:
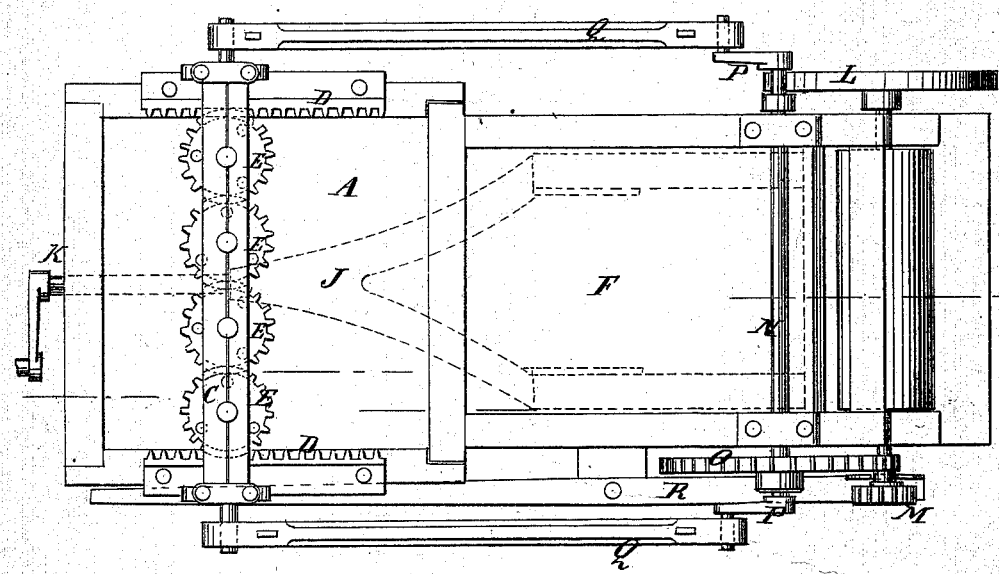
Figure 2:
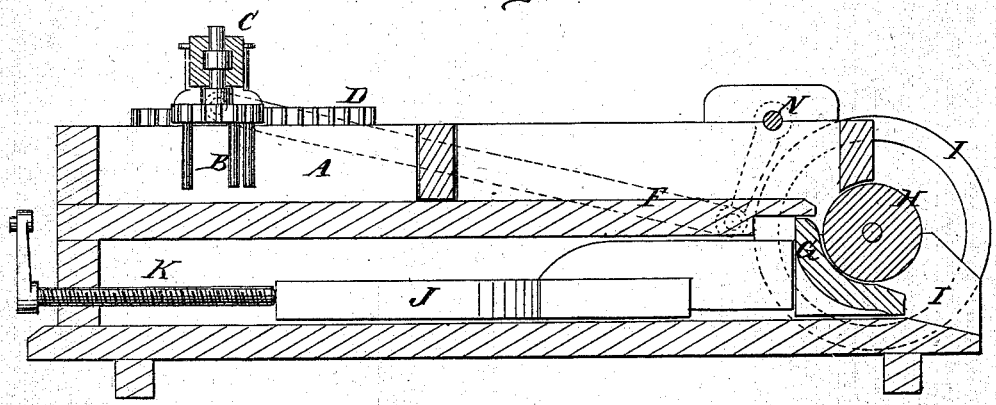

Figure 1 is a plan view; Fig. 2 is a horizontal section.

Similar letters of reference indicate corresponding parts.

A represents the mixing-vat. B is a series of mixers suspended in the vat from a carriage, C, and geared together and with stationary racks D, by wheels E, so that the carriage, which moves across the vat A from side to side, will cause the mixers to revolve. E is an adjoining vat for receiving the sand and lime after being mixed in vat A. G is a stationary concave grinder, and H a rotary one, working in connection with G. They are arranged at one side of the vat F, so that the lime and sand in it can be conveniently fed to the grinder by a hoe or shovel. The ground mortar will pass out through the spout I into any suitable receptacle. The concave grinder is arranged to slide toward and from the rotary one, and has a crotched presser, J, and feed-screw K, to adjust it for grinding fine or coarse. The cylinder H is on the shaft, having a large pulley, on which the driving-belt is applied. This shaft has a pinion, M, which drives the crank-shaft N by a large wheel, O. The crank-shaft works the carriage C by a crank, P, at each end, connected to the carriage by connecting-rods Q. The pinion M slides on the shaft on which it is mounted, and has a shipper-lever, R, connected with it to stop the movement of the mixing apparatus and start it, as required.

To operate the machine a batch of lime is put in the mixer and slaked; the mixer is then set in motion and the sand is added gradually until the mixture is complete; the mixer is then stopped and the contents shoveled into the vat F to be fed into the grinder; then another batch may be mixed while the first is being ground, and so on.

This machine is designed to do the mixing and grinding now done by hand with a hoe or shovel, and is calculated to economise largely in labor and do the work better. Large stationary machines may be used, if preferred, instead of the portable ones, and the mortar carried from them in carts to the place where it is to be used.

Having thus described my invention, I claim as new and desire to secure by Letters Patent—

1. The combination of a series of reciprocating and revolving mixers, B, with a vat, as described.

2. The combination, with mixing-vat A and grinders G H, of the intermediate vat F, arranged to receive the mixed material and allow it to be fed therefrom to the grinders in the manner described.

3. The combination of rotary grinder H, pinion M, wheel O, crank-shaft N, connecting-rods Q, reciprocating carriage C, stationary racks D, wheels E, and mixers P, as described.

4. The adjustable stationary grinder G, presser J, adjusting-screw K, and rotary grinder, combined and arranged substantially as described.

EDWARD SPAULDING.

Witnesses:
GEORGE W. WHITEHOUSE,
CHARLES F. THOMPSON.